Patented Aug. 7, 1951

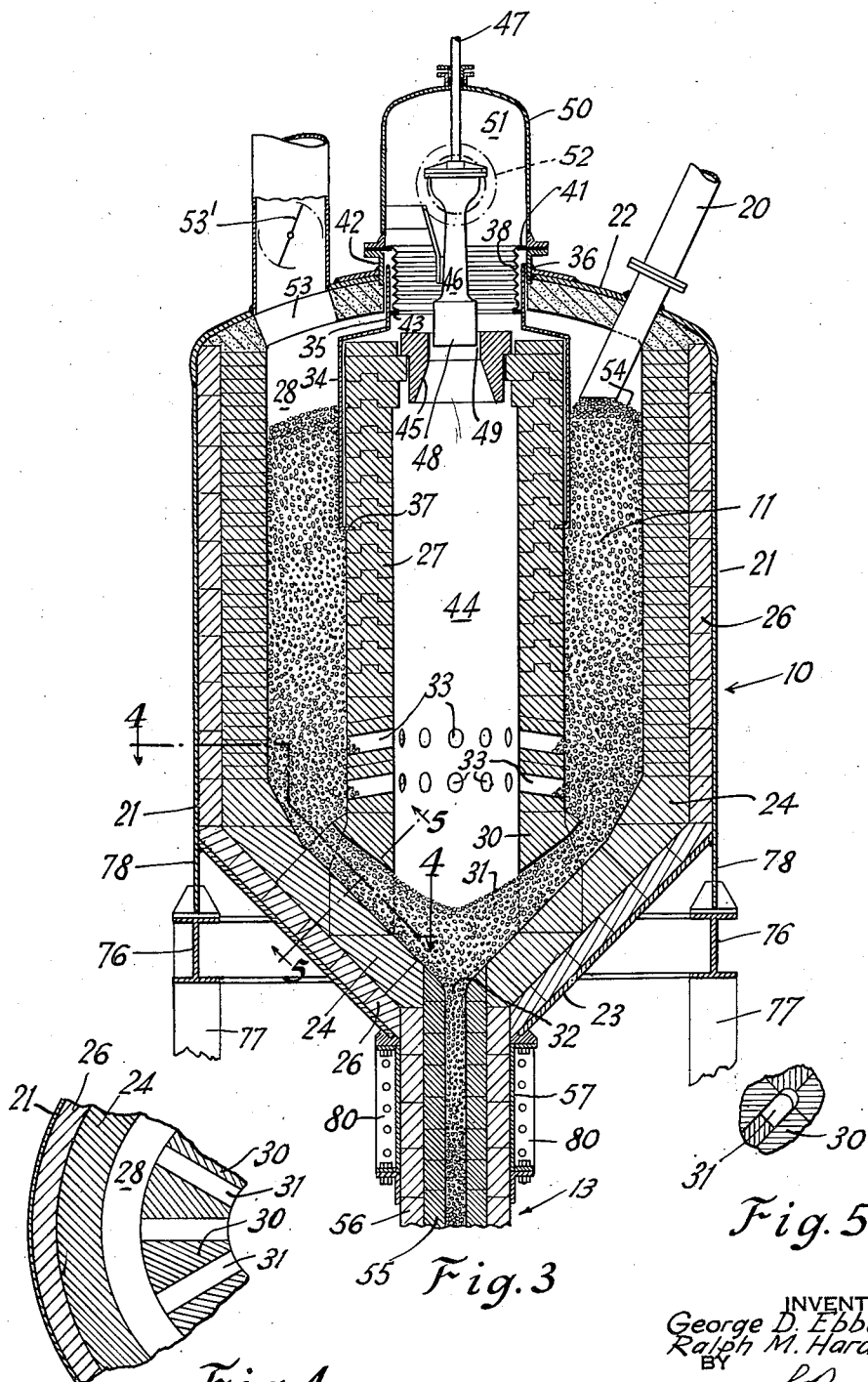

2,563,322

UNITED STATES PATENT OFFICE 2,563,322

PEBBLE HEATER

George D. Ebbets, Kenilworth, and Ralph M. Hardgrove, Westfield, N. J., assignors to The Babcock & Wilcox Company, Rockleigh, N. J., a corporation of New Jersey Application October 26, 1946, Serial No. 706,018

7 Claims. (Cl. 263—19)

The present invention relates to the construction and operation of fluid heaters of the type in which a fluent mass of solid heat transfer material is circulated downwardly through a heating chamber, in which it is heated by the passage of gaseous heating fluid in heat transfer relation therewith, and then through a connecting passage of reduced flow area to and through a subjacent cooling chamber, in which it is cooled by heat transfer to a second fluid to be heated. This general type of fluid heating apparatus is disclosed and claimed in a co-pending application of E. G. Bailey and R. M. Hardgrove, filed September 16, 1943, Serial No. 502,580, now Patent No. 2,447,506.

Fluid heaters of the type described usually employ small pieces or bodies of ceramic refractory materials arranged in a solid column or bed as the heat transfer medium and are capable of being continuously operated over extended periods of time at substantially higher temperatures than are permissible, or economically possible, with metallic heat exchangers. To obtain the most desirable heat transfer conditions in the fluid heating apparatus, the moving mass of heat transfer material should be heated so that upon discharge from the upper heating chamber the mass will be at a substantially uniform temperature throughout its entire horizontal cross-sectional area, yet avoiding overheating of any part of the mass, and upon heating a fluid in the lower chamber by direct contact heat exchange, the fluid discharged from the lower chamber will be at a substantially uniform predetermined temperature. To attain these results is primarily a problem of fluid distribution in making contact with and passing through the intersticies of the mass of heat transfer material. While the problem of fluid distribution for the fluid and solid contact in both chambers is generally the same with both the heating fluid and the fluid to be heated, there is a marked difference in the initial temperatures of the two fluids upon introduction into contact with the heat transfer material. The temperature at which the fluid to be heated is delivered to the lower chamber and into contact with the heat transfer material in the lower chamber is ordinarily low enough to permit the use of metallic parts to define the flow paths of the fluid. The temperature of the heating fluid however must be at least as high as the upper limit of the desired final temperature of the heat transfer material leaving the upper chamber, and this temperature will necessitate the use of high temperature refractory materials to define the flow paths of the fluid in contacting with the heat transfer material.

The heating fluid advantageously consists of the gaseous products of combustion resulting from the burning of a liquid or gaseous fuel, with or without the addition of excess air for the regulation of the heating gas temperature. The flow path of heating gas into the mass of heat transfer material within the upper chamber may be in directions normal or counter to the direction of movement of the mass, or at any intermediate angle thereto. The gas is advantageously introduced through a plurality of small port openings spaced for a substantially equal distribution of gases across the cross section of the mass. It is structurally advantageous to direct the flow of gases from the sides of the chamber so that the weight of the heat transfer mass will not be directly applied to the refractory parts defining the gas flow paths. With the gas introduced through ports in the outer wall of the chamber from a combustion chamber or heating gas duct surrounding the heating chamber, for example, the gas penetration into the mass will be dependent upon the cross sectional depth of the mass and the velocity of the entering gas streams. If the gas is unable to penetrate the entire cross section of the mass, the inner portions of the mass will be discharged from the heating chamber at a lower temperature than the portion adjacent the gas inlet ports. With deep penetration of the mass by the gas, as obtained by high initial gas velocities, the portions of the heat transfer material mass adjacent the ports will absorb a substantial portion of the heat in the gas so that the gas reaching the interior of the mass will be at an appreciably lower temperature. This condition is further aggravated by the tendency for the portions of the mass of heat transfer material adjacent the walls of the chamber to move downwardly at a slower rate than the portions radially spaced therefrom, due to wall friction, which will permit a greater time for heat absorption by the retarded portions and a consequent greater differential of temperature transversely of the mass.

The problem of uniform heat distribution in the introduction of heating gases into the heat transfer material mass of the upper chamber becomes more serious as the fluid heating capacity of this type of apparatus is increased. This is primarily due to the fact that with similar temperature and heating period requirements for the fluid to be heated, but with an increased amount of fluid to be heated, the depth of heat transfer material maintained within the heating chamber will remain substantially the same while the cross sectional area of the mass must be increased in proportion to the required increase in capacity. With a combustion chamber or heating gas duct surrounding the upper chamber, heat radiation losses will increase as the diameter of the chamber is increased.

We have found that the temperature of the heat transfer material can be maintained substantially uniform upon its discharge into the lower fluid heating chamber over a wide range of fluid heating capacities by the use of a relatively thin cross-section of moving heat transfer material into which the heating gases are introduced to pass upwardly through the interstices of the mass. By the use of a moving bed of heat transfer material having a desirably small transverse thickness with a correspondingly extended transverse length, the cross-sectional area of the bed may be increased to afford the desired fluid heating capacity of the apparatus while also increasing the area of initial heating gas contact. In addition, the extended transverse length of the bed may be formed as an annulus with the interior of the annular bed advantageously hollowed to provide a space for an internal combustion chamber or heating gas inlet which will simplify the construction and reduce the initial and operating costs of the apparatus. Fluid heating apparatus constructed as described can also be readily manufactured to withstand high internal pressures without the use of heavy and expensive construction materials.

The main object of the present invention is the provision of fluid heating apparatus of the type described which is characterized by its ability to heat fluids continuously to substantially uniform temperatures over a relatively wide range of fluid capacities. A further and more specific object is the provision of apparatus of the type described which is capable of economical construction and operation in heating large volumes of fluids at superatmospheric temperatures and pressures. Another object is the provision of fluid heating apparatus of the type described having a high fluid heating capacity and an ability to operate over extended periods of time with low maintenance expense and to occupy a relatively small space. A further object is to provide a gas and solid contact device wherein a fluent mass of solids is arranged in a continuously downward moving annular bed of substantially constant depth, with the inner wall defining the annular bed enclosing a combustion space available for the production of the heating gases subsequently passed in heat exchange contact with the bed of fluent solids, whereby the radiant heat from said combustion space is transferred through the intervening wall and largely absorbed by the annular bed of fluent solid material.

The various features of novelty which characterize our invention, are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Of the drawings:

Fig. 3 is an enlarged sectional elevation of a portion of the apparatus shown in Fig. 1;

Figures 1, 2:
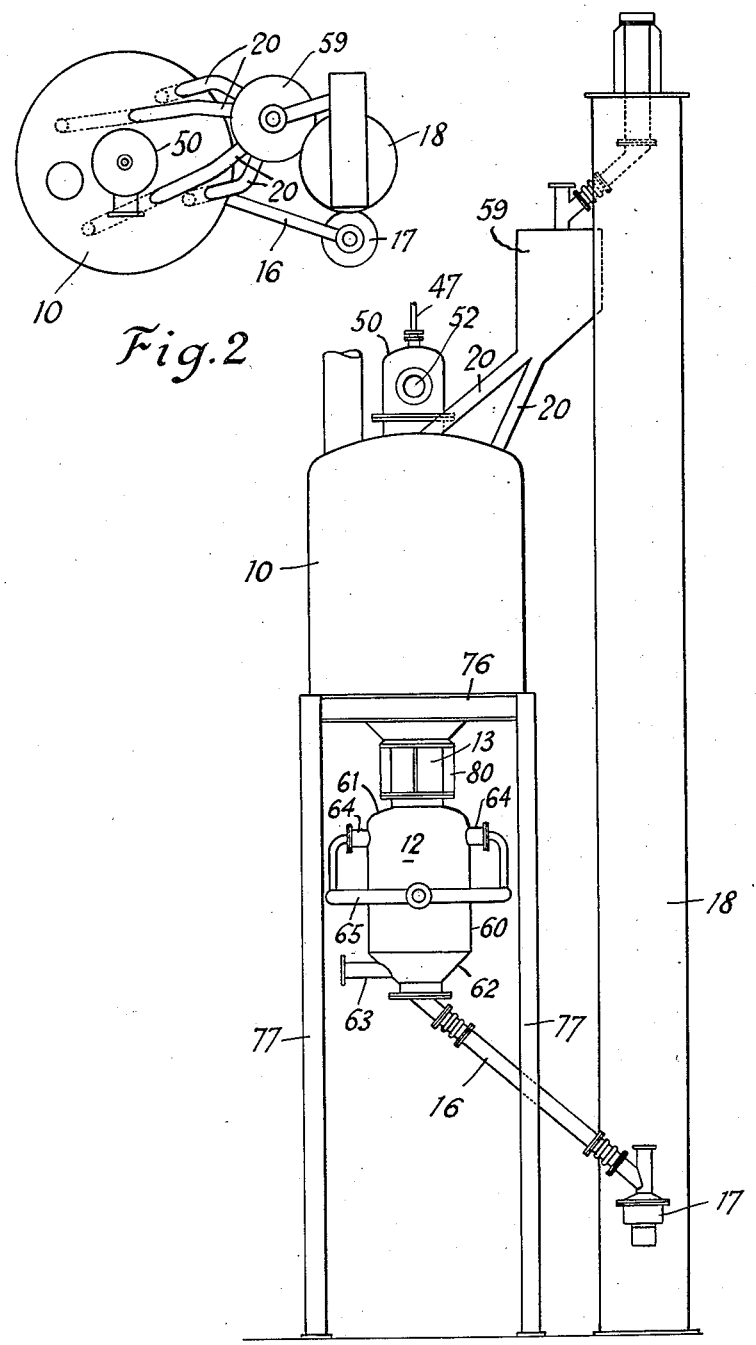
Fig. 1 is an elevation of fluid heating apparatus constructed in accordance with the present invention.
Fig. 2 is a plan view of the apparatus shown in Fig. 1.
Figure 6:
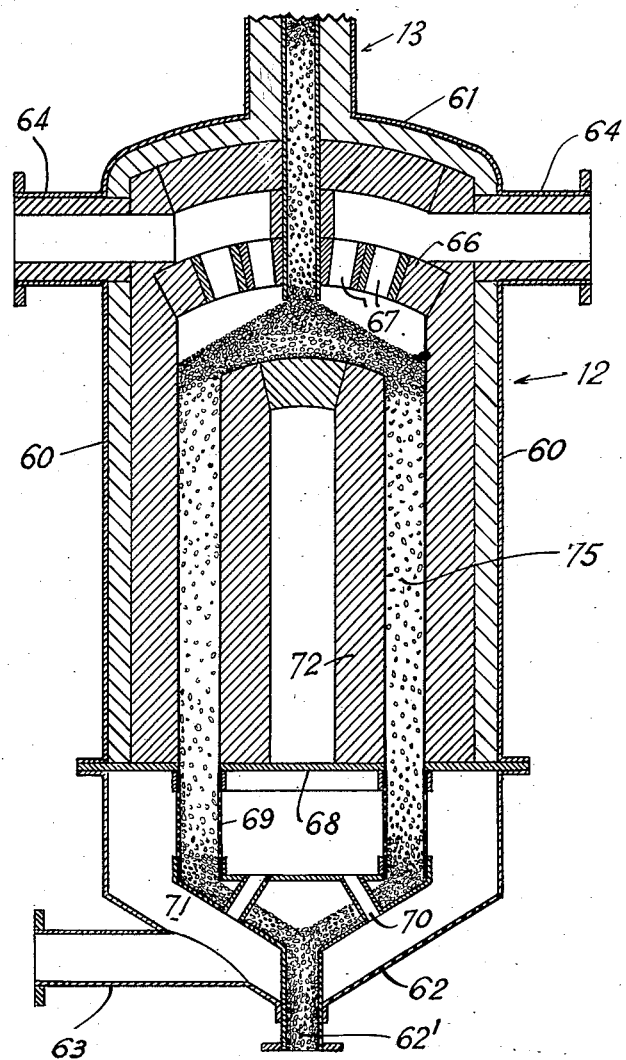

Figs. 4 and 5 are sectional views taken on lines 4—4 and 5—5 respectively of Fig. 3; and Fig. 6 is an enlarged sectional elevation of another portion of the apparatus shown in Fig. 1.

The fluid heater construction illustrated in general includes an upper heating chamber 10 wherein a fluent mass of solid heat transfer material 11 is heated by direct contact with a heating fluid, and a lower cooling chamber 12 wherein the heated heat transfer material 11 is cooled by direct contact with a fluid to be heated. The chambers 10 and 12 are connected by a tubular conduit or throat 13 of substantially smaller cross-sectional flow area which forms a passageway therebetween for the flow of heat transfer material from the upper chamber to the lower chamber. In the illustrated embodiment of the invention, the heating fluid for the heat transfer material 11 in the chamber 10 consists of gaseous products of combustion which are advantageously produced in a combustion chamber located centrally within the chamber 10, and directed into direct heating contact with substantially uniform flow through the interstitial spaces of the heat transfer mass, the mass being a downwardly moving bed of substantial depth and extended circumferential length. The heat transfer material is heated to a relatively high temperature during its passage through the upper chamber 10, and in passing through the lower chamber 12 its temperature is reduced by heat exchange with the fluid to be heated. The cooled heat transfer material leaves the lower chamber 12 through a discharge pipe or spout 16 connected at its lower end to a suitable continuous mechanical feeder 17. The feeder regulates the rate of withdrawal of heat transfer material from the chamber 12 and discharges it into a continuous bucket elevator 18 or other conveying means which delivers the heat transfer material through a plurality of feed spouts 20 into the upper chamber for reuse in the heat exchange process. The continuous feeder 17 receiving the heat transfer material from the discharge spout 16 is advantageously of the variable speed rotary plate type disclosed in a co-pending application of A. M. Kohler, Serial No. 569,251, filed December 21, 1944, now Patent No. 2,468,712, and may be used with or without fluid sealing valves depending upon the character of the fluid being heated.

A relatively wide range of refractory materials can be used as the fluent mass of solid heat transfer material 11, the material selected depending upon the particular operating conditions to be maintained within the fluid heating unit. In general, the material should have a high strength and hardness, substantial resistance to thermal shock, and a high softening temperature. Such materials may be natural or manufactured ceramic refractories, corrosion resistant alloys or alloy steels, in small pieces of regular or irregular shape. As disclosed in said prior Bailey et al. application, substantially spherical pellets or "pebbles" of manufactured ceramic refractories have been successfully used. The pellets should be a size such as to provide a large amount of surface area for transfer of heat and of a density sufficient to withstand the fluid flow velocities through the pellet mass while in the heating and cooling chambers without lifting. One desirable size of ceramic refractory pellet has been found to be approximately 1/16 inch in diameter, but the size may be varied above and below that value depending upon the desired operating conditions in the fluid heater.

As shown in Fig. 3, the upper or pellet heating chamber 10 is defined by a cylindrical metallic casing 21 having a domed top 22 and an inverted frusto-conical bottom plate 23, with all the interior surfaces thereof protected by a lining 24 of one or more layers of suitable refractory material. The lining of the domed top 22 is formed by a monolithic poured refractory material, while in addition to the refractory lining 24, the cylindrical casing 21 and the inverted frusto-conical bottom plate 23 are further protected by a layer of insulating material 26 interposed between the casing 21 and lining 24.

An upright refractory cylindrical wall 27 is centrally positioned within the chamber 10 with its outer face radially spaced from the inner face of the lining 24 to define an annular chamber or passageway 28 therebetween having a circumferential length many times greater than its transverse radial width. The wall is supported on a series of circumferentially spaced piers 30 which are in turn built into the lining 24 and supported by the inverted frusto-conical bottom plate 23. As shown in Fig. 4, the piers have a series of inwardly flaring inclined openings 31 therebetween, whereby the heat transfer material 11 can flow freely from the annular passageway 28 to a centrally positioned outlet 32 forming the entrance to the throat 13. The wall 27 is constructed with one or more rows of circumferentially spaced ports 33 radially extending through the wall and inclined downwardly toward their outer ends so that with the natural angle of repose of the heat transfer material, the material will not extend very far into the ports. The wall 27 extends upwardly to a spaced position adjacent the top 22 and, as disclosed and claimed in a copending application of Paul R. Grossman, Serial No. 84,890, filed April 1, 1949, is provided with a metallic sleeve 34 encircling its upper portion. The sleeve 34 extends from a location intermediate the height of the wall 27 to the upper end thereof where the sleeve is provided with an attached cylindrical extension 35 of reduced diameter which is arranged to project upwardly through a corresponding centrally located opening 36 through the domed top. As shown, the lower end of the sleeve 34 has an internal flange 37 embedded in the wall 27, while its upper end is provided with a flexible bellows seal connection 38 arranged to permit differential expansion and contraction of the wall 27 relative to the other portions of the chamber 10 as caused by differential temperature changes while simultaneously providing a structural support to the upper portion of the wall 27.

The flexible bellows 38 is a section of corrugated steel plate which is formed with the corrugations circumferentially arranged so as to permit axial elongation and contraction. The upper edge of the bellows is attached to an annular plate 41 which is bolted to a rigid flanged collar 42 welded to the domed top 22 and surrounding the opening 36 in the top of the chamber. The lower edge of the bellows 38 is attached to an inwardly projecting flange 43 upon the cylindrical sleeve extension 35. With this construction the wall 27 is free to move vertically with respect to the top 22, and the cylindrical extension 35 through the opening 36 will aid in maintaining the axial alignment of the wall 27 with respect to the opening while maintaining a gas-tight connection between the upper portion of the annular passageway 28 and the corresponding portion of the combustion chamber 44 enclosed by the annular wall 27.

In the upper end of the combustion chamber 44 is arranged a ported burner block 45 through which a fuel burner 46 discharges. In the embodiment shown, the burner 46 is of the pre-mixing type wherein a gaseous fuel, such as natural gas or the like, is delivered through a supply conduit 47 and mixed with a major portion of the required combustion air in the body of the burner 46 and the mixture discharged from the burner tip 48 through the block 45. The upper end of the burner is enclosed by a metallic bell-like dome 50 which is attached to the flange of collar 42 and defines an air chamber 51 into which combustion air is delivered through an inlet 52. A portion of the air delivered to the air chamber 51 enters the burner block 45 through an annular opening 49 between the burner tip 48 and the block, and mixes with the combustible mixture of fuel and air discharged from the burner tip. An additional portion of combustion air will pass through the annular space between the sleeve 34 and the adjacent surface of the wall 27 to enter the chamber 44 by leakage through the intervening refractories, with an appreciable cooling effect on the metallic sleeve 34. Thus, with fuel and air discharging through the burner block 45, the internal chamber 44 will form a combustion space which is of sufficient cross-section area and length to permit substantially complete combustion of the fuel before the resultant gases of combustion escape through the ports 33 into the lower portion of the annular passageway 28.

The annular chamber or passageway 28 receives the pellets of heat transfer material 11 from the spouts 20 which are arranged to project through the top of the chamber 10 and to end at spaced positions in the upper portion of passageway 28. As shown in Fig. 2, four circumferentially spaced spouts 20 connect the bin 59, which receives the heat transfer material discharged by the elevator 18, to the chamber 28. In the operation of the fluid heating apparatus the chambers 10 and 12 are filled with the heat transfer material up to the level determined by the lower end of the spouts 20. Additional heat transfer material is maintained within the reservoir 59 so that the spouts 20 are filled and as the material 11 is circulated through the apparatus there will always be a sufficient supply to maintain the depth of material within the chamber 10 substantially uniform. With the chamber 10 proportions generally as shown and the outside diameter thereof approximately 8 feet, we have found that with four spouts 20 and with the heat transfer material previously described (i. e. 1/16" diameter pellets having a natural angle of repose of approximately 20°) the circumferential variation in the depth of pellet bed between the ports 33 and the upper surface 54 thereof is insufficient to adversely effect the uniformity of heating gas flow through the heat transfer material in the passageway 28. When the diameter and/or width of the annular passageway 28 is increased beyond that indicated, it is desirable to increase the number of spouts delivering heat transfer material thereto so as to maintain an essentially even distribution of heating gas flow circumferentially of the passageway to advantageously maintain a uniformity of pellet temperature entering the chamber 12.

The annular space in the upper end of the passageway 28, above the surface 54 of the heat transfer material, is provided with stack outlet 53 containing a control damper 53' for the disposal of spent heating gases. The movement of heating gases upwardly through the interstices of the heat transfer material mass from the level of the ports 33 will be substantially uniform throughout the extent of the annular mass and as a result, the temperature of any segment in a horizontal cross-section of the annular mass will be substantially equal to every other segment.

The connecting throat 13 is of circular section and is defined by a circular series of refractory pieces 55 extending from the outlet 32 of the inverted frusto-conical bottom to the upper end of the lower chamber 12. This throat is provided with a backing of insulating material 56 which is supported from a sectional metallic casing 57. The dimensions of the vertically elongated throat 13 are such as to provide a length sufficient, when filled with the heat transfer material 11, to restrict gas flow between the chambers 10 and 12 and yet provide a diameter sufficient to permit free flow of the heat transfer material from the upper to the lower chamber. Fluid flow between the chambers can be prevented or regulated, as disclosed in said Bailey and Hardgrove application, by controlling damper 53' in response to the pressure differential across the throat 13.

The lower chamber 12 is circular in horizontal cross-section and of substantially uniform diameter from its upper end to a downwardly tapered conical bottom. As shown in Figs. 1 and 6, the chamber 12 is encased in a metallic gas-tight casing 60 having a domed top 61 arranged to receive the throat 13 and an inverted frusto-conical bottom 62. The bottom 62 is provided with a central outlet opening 62' for the discharge of heat transfer material from the chamber into the spout 16. A feed pipe 63 for the fluid to be heated is arranged to direct a flow of that fluid into the lower portion of the chamber 12 for subsequent upward movement of the fluid through the interstices of the heat transfer mass and to be discharged at the desired temperature from the upper end of the chamber through the discharge pipes 64. The discharge pipes conduct the heated fluid from the upper end of the chamber 12 into a collecting conduit 65 for discharge to a point of use. The internal arrangement of the lower chamber 12 may be constructed as disclosed in the said Bailey and Hardgrove application or if desired, it may be constructed as an annular heat exchange chamber similar to the upper chamber 10, as shown in Fig. 6.

In the Fig. 6 construction, the throat 13 is continued downwardly to a level below a refractory arch 66 having a series of outlet slots 67 therein for the heated fluid passing to the discharge pipes 64. The casing 60 is lined with insulation and refractory similarly to the casing 21. A cylindrical box 68 having a perforated peripheral side 69 is positioned in the lower part of the chamber 12 and connected by pipes 70 to a bottom chamber 71, into which the inlet pipe 63 opens. A substantially cylindrical vertically elongated hollow refractory filler member 72 closed at its upper end is mounted on the box 68 and in conjunction with the casing wall defines an annular chamber or passageway 75 for the descending mass of pellets. With this arrangement, the fluid to be heated is supplied through the pipe 63 into the chamber 71, from which it flows through the pipes 70 into the box 68, being discharged therefrom through the perforated wall 69 into the lower end of the descending annular bed of pellets. The passage of the fluid upwardly through the gas-pervious mass causes it to be heated to a uniform high temperature, before being discharged through the arch slots 67 to the pipes 64.

The fluid heating apparatus, including the chambers 10 and 12 and the connecting throat 13 are supported as a unit from structural steel work located adjacent the inverted frusto-conical bottom of the upper chamber 10. This is shown particularly in Fig. 3, wherein a framework of heavy I-beams 76 on the columns 77 are affixed to the joint between the vertical sides of the upper chamber casing 21 and the upper end of the frusto-conical bottom plate 23 by webb members 78. The plate 23 supporting the bottom of the upper chamber is heavier than the corresponding sections of the casings 21 and 60 for either the upper or lower chambers and due to its inverted conical shape has a high structural strength. The sectional casing 57 for the throat 13 is reinforced by angle iron stiffeners 80 to provide rigidity for the throat 13 and sufficient structural strength to support the lower chamber 12. With this construction the upper chamber 10 is free to expand upwardly from the level of the I-beams 76, and likewise the throat 13 and the lower chamber 12 are free to expand downwardly from this same fixed level.

In operation the mass of heat transfer material is moved through the chambers 10 and 12 and intervening throat 13 by operating the feeder 17 at a substantially continuous predetermined rate which may be varied as desired to accommodate changed temperature requirements in the apparatus. Leaving the feeder, the material is elevated and returned to the upper chamber to repeat the cyclic heating and cooling thereof. Within the upper chamber the heat transfer material is heated to a substantially uniform temperature, so that upon entering the lower chamber the heat given up by that material in contacting the fluid to be heated is so distributed as to insure a substantially equalized temperature through all portions of the fluid upon its discharge through the pipes 64. By maintaining constant the flow rate, temperature and composition of the fluid to be heated upon entering the chamber 12, the flow of heated fluid discharged through the pipes 64 may also be continuously maintained substantially equal with any desired temperature regulation obtained by an alteration in the easily controlled rate of fuel delivered through the burner 46.

It will be noted that the present invention discloses a fluid heater construction that is particularly well adapted to high pressure use since the external wall of the upper chamber is cylindrical and uninterrupted by openings in the side for the admission of fuel or air and the weight of the parts may be at a minimum without weakening the structure. While the outer thrust of the heat transfer materials in the upper chamber can be easily and safely absorbed by the casing 21, the inner thrust of this material can also be easily absorbed by the cylindrical wall 27 even at the elevated temperatures ordinarily encountered in operation, since such inward thrust will subject this wall to a compressive strain which refractory materials are well able to withstand, even at high temperatures.

While in accordance with the provisions of the statutes we have illustrated and described herein the best form of the invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. A solid and gas contact device comprising coaxial cylindrical walls defining an annular chamber therebetween and an internal combustion chamber, a common top to said cylindrical walls having at least one inlet opening therein for the introduction of a fluent solid material to said annular chamber and at least one outlet opening therein for the escape of gas from said annular chamber, an inverted frusto-conical bottom common to said chambers and having a centrally located outlet for fluent solid material, a plurality of circumferentially spaced piers on said bottom arranged to support the inner wall of said annular chamber and to define a circumferential series of openings for the passage of a gas-pervious mass of fluent solid material from said annular chamber to said centrally located outlet, means for causing a downward movement of said fluent solid material within said annular chamber, means for maintaining the level of said fluent solid material within said annular chamber substantially uniform, and means for heating said fluent solid material within said annular chamber including a burner arranged to discharge fuel and air downwardly into said combustion chamber and a circumferentially spaced series of passageways through the cylindrical wall of said combustion chamber arranged to direct the flow of combustion gases generated therein into the annular chamber for upward flow through said fluent solid material to said gas outlet.

2. Heat exchange apparatus comprising a chamber defined by a gas-tight casing of substantially uniform horizontal circular cross-section having a top and bottom closure, an internal cylindrical wall coaxial with and radially spaced from said casing, means for maintaining a gas-pervious mass of continuously downwardly moving fluent solid heat transfer material within the annular chamber formed by said radially spaced walls including a plurality of circumferentially spaced heat transfer material delivery spouts arranged to project below the top of said annular chamber, a burner arranged to deliver a combustible mixture of fuel and air into the space defined by said internal wall for the generation of a heating gas by the combustion of fuel therein, and means for directing a substantially uniformly distributed flow of said heating gas into the lower end of said annular chamber for upward flow through the annular chamber in direct contact with the mass of heat transfer material therein.

3. A fluid heater comprising an upper chamber having a solid material inlet and a gas outlet at its upper end and a solid material outlet at its lower end, a lower chamber having a solid material outlet and a gas inlet at its lower end and a gas outlet at its upper end, means forming a throat passage of substantially reduced cross-section between said upper chamber solid material outlet and said lower chamber, a vertically elongated refractory structure in said upper and lower chambers spaced from the walls thereof to define an annular passage therebetween, means for maintaining a flow of a gas-pervious mass of fluent solid heat transfer material downwardly through said upper annular passage, throat passage, and lower annular passage, means for maintaining a circumferentially distributed flow of a heating gas through said upper chamber refractory structure into the lower part of said upper chamber annular passage in direct contact countercurrent flow relationship with the fluent solid material therein, and means for maintaining a circumferentially distributed flow of a gaseous fluid to be heated through said lower chamber refractory structure into the lower part of said lower chamber annular passage in direct contact countercurrent flow relationship with the fluent solid material therein.

4. A fluid heater comprising an upper chamber having a solid material inlet and a gas outlet at its upper end and a solid material outlet at its lower end, a lower chamber having a solid material outlet and a gas inlet at its lower end and a gas outlet at its upper end, a substantially unobstructed passage forming a throat of substantially reduced cross-section between said upper chamber solid material outlet and said lower chamber, a vertically elongated refractory structure in each of said upper and lower chambers spaced from the walls thereof to define an annular passage therebetween of narrow transverse width, means for maintaining a substantially continuous flow of a gas-pervious mass of fluid solid heat transfer material downwardly through said upper annular passage, throat, and lower annular passage, means for maintaining the depth of fluid solid material in each of said chambers substantially uniform, means for introducing a heating gas through said upper chamber refractory structure into the lower part of said upper chamber annular passage for flow therethrough in direct contact with the fluent solid material therein, and means for introducing a gaseous fluid through said lower chamber refractory structure into the lower part of said lower chamber annular passage in direct contact with the fluent solid material therein.

5. Heat transfer apparatus comprising gas impervious refractory wall defining a chamber having a heating gas outlet in its upper end and a solid material outlet in its lower end, means for maintaining a substantially continuous flow of a gas-pervious mass of fluent solid heat transfer material downwardly through said chamber to said material outlet, a vertically elongated fluid conduit having its discharge end submerged in and opening to the mass of solid material within the lower end of said chamber, and means for supplying a combustible mixture to said conduit for generating heating gases including a burner positioned at the top of said conduit and passing said heating gases upwardly through said descending mass of solid material.

6. A solid and gas contact device comprising spaced cylindrical walls having a common vertical axis and defining an annular chamber therebetween, means for causing a substantially uniform and continuous movement of a gas-pervious mass of fluent solid heat transfer material downwardly through said chamber, means for maintaining the level of said gas-pervious mass of fluent solid heat transfer material within said annular chamber substantially uniform, a centrally positioned heating gas duct defined by the inner cylindrical wall of said annular chamber and having a circumferentially spaced series of ports in the lower portion of the wall thereof so arranged as to direct a flow of heating gases downwardly through said duct and thence through the ports into the fluent heat transfer material in said annular chamber, and means for generating high temperature heating gases in said duct including a burner positioned at the top of said duct.

7. A solid and gas contact device comprising radially spaced coaxial cylindrical walls defining an annular chamber therebetween and a centrally located combustion chamber, a heating gas outlet at the upper end of said annular chamber, an inverted frusto-conical bottom extending downwardly from the outer of said cylindrical walls to a centrally located outlet, a plurality of circularly spaced piers resting upon said frusto-conical bottom and supporting the inner of said cylindrical walls, introducing means for maintaining a substantially uniform depth of a downwardly moving mass of gas-pervious fluent solid material in said annular chamber, and means for burning a fuel within said combustion chamber and heating said fluent solid material by direct contact countercurrent flow relationship with the heating gas so generated.

GEORGE D. EBBETS.
RALPH M. HARDGROVE.

REFERENCES CITED

The following references are of record in the file of this patent:

UNITED STATES PATENTS

| Number | Name | Date |
| --- | --- | --- |
| 166,757 | Eustis | Aug. 17, 1875 |
| 688,651 | Kirk | Dec. 10, 1901 |
| 1,576,916 | Lasche | Mar. 16, 1926 |
| 1,669,012 | Nordstrom | May 8, 1928 |
| 1,989,072 | Billinghurst | Jan. 29, 1935 |
| 2,303,717 | Aveson | Dec. 1, 1942 |
| 2,417,049 | Bailey | Mar. 11, 1947 |